Dec. 5, 1939.   H. H. DECKER   2,182,172
SPECIFIC GRAVITY INDICATOR
Filed March 29, 1937

WITNESS:
Rob't R. Mitchel.

INVENTOR
Howard H. Decker
BY
Augustus B. Stoughton
ATTORNEY.

Patented Dec. 5, 1939

2,182,172

UNITED STATES PATENT OFFICE 2,182,172

SPECIFIC GRAVITY INDICATOR

Howard H. Decker, Fairview, N. J., assignor to Schutte & Koerting Company, Philadelphia, Pa., a corporation of Pennsylvania Application March 29, 1937, Serial No. 133,517

2 Claims. (Cl. 265—44)

The objects of the present invention are to provide a simple device of the character mentioned by means of which the specific gravity or density of fluids (including liquids and gases) can be determined instantly and at a glance. Another object of the invention is to so construct the apparatus that it is complete in itself and obviates the use of delicate and easily broken or mislaid instruments and also obviates the presence of a free surface of liquids which is liable to spill or slop over. Another object of the invention is to provide a device of the character indicated and such that it can be installed as a permanent anti-freeze meter on an automobile or as a permanent hydrometer on a pipe line. Another object of the invention is to provide means for adjusting the instrument according to temperature.

Other objects of the invention will appear from the following description at the end of which the invention will be claimed.

Generally stated the invention comprises a submerged body with a greater specific gravity than that of the liquid to be measured but with less specific gravity than that of mercury and a rod attached to the lower side of the submerged body and partially submerged in a column of mercury contained within a transparent calibrated tube so that the rod will displace the mercury as it rises and falls and the establishment of equilibrium will indicate the specific gravity of the liquid being measured, which is read on the scale.

The invention also comprises the improvements to be presently described and finally claimed.

In the following description reference will be made to the accompanying drawing forming part hereof and in which.

Figure 1:
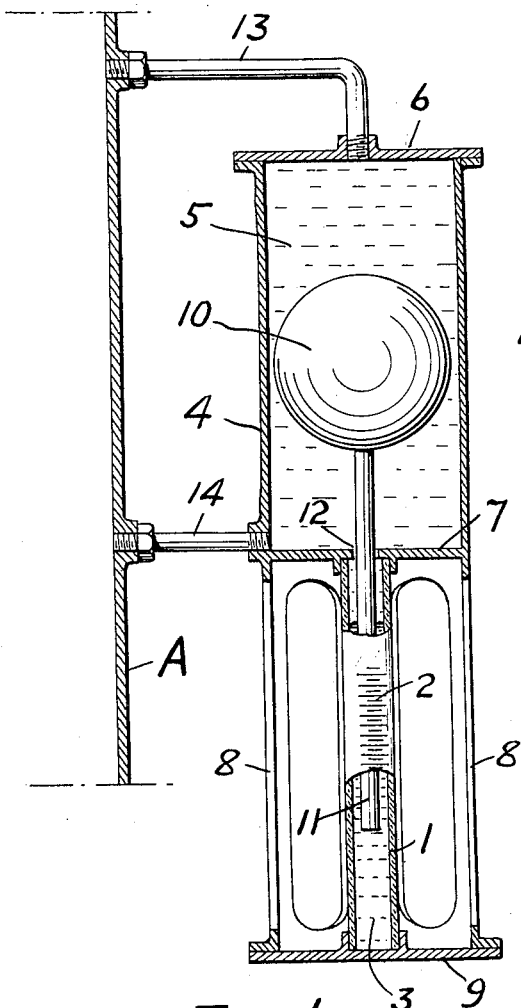
Figure 1 is an elevational view principally in section of apparatus embodying features of the invention shown in application to a tank.
Figure 2:
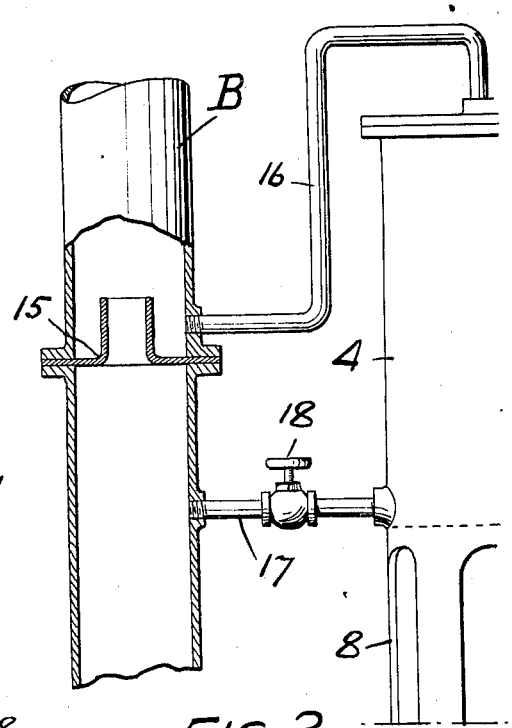
Fig. 2 is a similar view illustrating the apparatus in application to a pipe line.

Referring to the drawing the device comprises a straight tube or column closed at its ends and of which the lower part 1 constitutes a vessel and is transparent and provided with a scale 2 and is of relatively small cross sectional area. The lower part 1 is adapted to contain a liquid 3 heavier than the fluid to be measured; an example of the heavier liquid is mercury. The upper part 4 of the column constitutes a compartment and is of relatively large cross sectional area and it is adapted to be filled with a supply of the fluid 5 to be measured. The fluid 5 floats on the heavier liquid 3. The part 4 is shown as a cylindrical compartment and it is provided with a head 6 and is supported at its base 7 by legs or feet 8 mounted upon a head 9 which serves to close the lower end of the smaller part or transparent tube 1. 10 indicates a float device submerged in the lighter fluid 5. The center of gravity of the float device 10 is preferably below its center of figure. Depending from the float device 10 freely into the heavier liquid 3 is an extension or rod 11, this rod dips into the heavier liquid 3 and since it passes thru an opening 12 there is no friction at the point 12.

Normally and when the specific gravity or density of the liquid has a certain value the float device is balanced and is in equilibrium in the liquids 3 and 5. If the specific gravity or density of the fluid 5 should change the float device is unbalanced and will move either up or down thus changing the displacement and level of the heavier liquid 3 and this change can be noted on the scale 2 and it is an indication of the specific gravity of the fluid 5. The level of the mercury within the tube 1 will rise and fall inversely relative to the rod.

The instrument may be used for measuring the specific gravity of liquid contained in a tank A. For this purpose there is a connection 13 from the tank thru the head 6 and another connection 14 from the tank to the bottom of the vessel 4.

Figure 3:
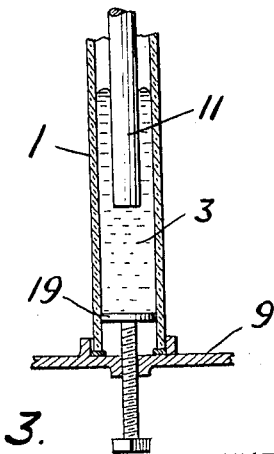
Fig. 3 is a sectional detail view illustrating an adjustment for temperature correction.

The instrument may also be used in connection with the measurement of flowing fluid under pressure thru the pipe line B. For this purpose the compartment 4 is connected at the top and bottom thereof to the opposite sides of an ajutage 15 as by pipe connections 16 and 17 provided with a valve 18. The valve 18 is used when the specific gravity of a liquid in the pipe B is being read or measuresd so that flow may not interfere with the correctness of the reading. To correct for temperature changes use may be made of the adjustable piston 19 shown in Fig. 3 and arranged at the bottom of the tube 1. The purpose of this piston is to raise or lower the level of the mercury in respect to the sight level gauge 2 when the instrument is calibrated or adjusted. The sight gauge at the level of the liquid 3 or mercury can be read even though the liquid of which the specific gravity is to be ascertained is opaque or cloudy.

It will be obvious to those skilled in the art to which the invention relates that modifications may be made in details of construction and arrangement and in matters of mere form without departing from the spirit of the invention which is not limited in respect to such matters or otherwise than as the prior art and the appended claims may require.

I claim:

1. A specific gravity indicator comprising, a closed compartment adapted to contain the fluid whose specific gravity is to be measured and having an inlet and an outlet connection thereto, a vessel of transparent material having its interior in communication with the interior of said compartment, a liquid in said vessel which is relatively heavy compared with the fluid whose specific gravity is to be measured, a float device having a portion of relatively large cross-section immersed in the fluid whose specific gravity is to be measured and having a rigid portion of relatively small cross-section immersed in said heavier liquid to displace the same, and indicia on a vertical wall of said vessel relative to which said float device travels so as to indicate the movement of said float device due to the change of specific gravity of the fluid in said compartment by movement of the free surface of said relatively heavy liquid in said vessel as displaced by the rigid portion of the float.

2. A specific gravity indicator comprising, a closed compartment containing a fluid whose specific gravity is to be measured and having an inlet and an outlet thereto, a vessel having a vertical wall of transparent material and having its interior in communication with the interior of said compartment beneath said inlet and said outlet, a liquid in said vessel which is relatively heavy compared with the fluid whose specific gravity is to be measured, a float device having a portion immersed in the fluid whose specific gravity is to be measured and having a lower portion immersed in said heavier liquid to displace the same, and indicia on said transparent wall of said vessel relative to which said float device travels so as to indicate the movement of said float device due to the change of specific gravity of the fluid in said compartment by movement of the free surface of said relatively heavy liquid in said vessel as displaced by said float device.

HOWARD H. DECKER.